O. W. TAFT.
Combined Carving-Knives and Skewer-Pulls.
No. 6,012. Reissued Aug. 11, 1874.
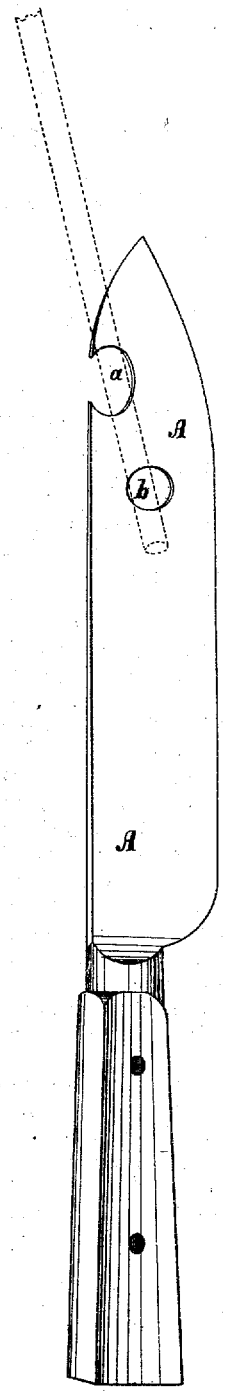
WITNESSES:
Alex F. Roberts
Frank Blackley
INVENTOR:
O. W. Taft
BY Munn & Co
ATTORNEYS.
THE GRAPHIC CO. PHOTO-LITH. 39 & 41 PARK PLACE, N.Y.

UNITED STATES PATENT OFFICE.

OWEN W. TAFT, OF NEW YORK, N. Y.

IMPROVEMENT IN COMBINED CARVING-KNIVES AND SKEWER-PULLS.

Specification forming part of Letters Patent No. 102,617, dated May 3, 1870; reissue No. 6,012, dated August 11, 1874; application filed July 18, 1874.

*To all whom it may concern:*

Be it known that I, OWEN W. TAFT, of New York city, in the county and State of New York, have invented a new and Improved Skewer-Pull, of which the following is a specification:

My invention consists of a skewer-pull for pulling the skewers out of meats preparatory to carving them, the said skewer-pull being a plate of metal with a little notch in one edge, or a hole directly through it, contrived and adapted to gripe the skewer by inserting the end projecting from the meat in the hole or notch, and turning the plate so that the two diagonally-opposite corners or edges of opposite sides of the plate will "bite" the skewer on opposite sides, and hold on to pull it out by pulling sufficiently on the handle. My invention also consists of a skewer-pull of this character, contrived in the blade of a carving-knife to utilize the knife for the handle of the skewer-pull, and to insure the presence of the pull with the knife.

The drawing is a side elevation of a skewer-pull of my invention, whereof the handle is a carving-knife, the pull being found in the blade thereof.

A is a plate, of thin metal, in which I make a notch, *a*, in the edge, or a hole, *b*, through the plate near one end, adapted to gripe a skewer, as indicated in the dotted lines, and pull it out of the meat readily, thus making a very simple contrivance, by which the skewers which are so difficult to get out by the hands or the cutting-edge of the carving-knife can be at once taken out without any inconvenience whatever.

I have taken the blade of a carving-knife for the plate, in which to form the notch or hole, because, as above stated, it may serve for both tools. The notch is made in the back of the blade near the point, and it is made in oblong shape, but it may be made in any form that may be preferred. The hole is placed farther back from the point than the notch to avoid weakening the plate or blade, as it would do if forward of the notch. The notch may also be formed by means of lugs or projections formed on the edge instead of by a notch in the edge.

The notch or aperture may be of suitable form and size, and may be so arranged as to ornament the blade of the knife, as well as to increase its usefulness.

The notch or jaws may, if desired, be formed on the shank or handle of the knife.

Having thus described my invention, I claim as new and desire to secure by Letters Patent—

1. A skewer-pull, consisting of a thin plate of metal, having a notch, *a*, in the edge, or a hole, *b*, through it, arranged and adapted for a skewer-pull, substantially as specified.

2. A new article of manufacture, consisting of a knife having a skewer-pulling notch or perforation formed in it, substantially as specified.

Witnesses: OWEN W. TAFT.

A. P. THAYER,

T. B. MOSHER.